Jan. 23, 1945. A. E. MONTGOMERY Re. 22,593
FINISHING AND CONDITIONING OF PAPER
Original Filed May 27, 1938
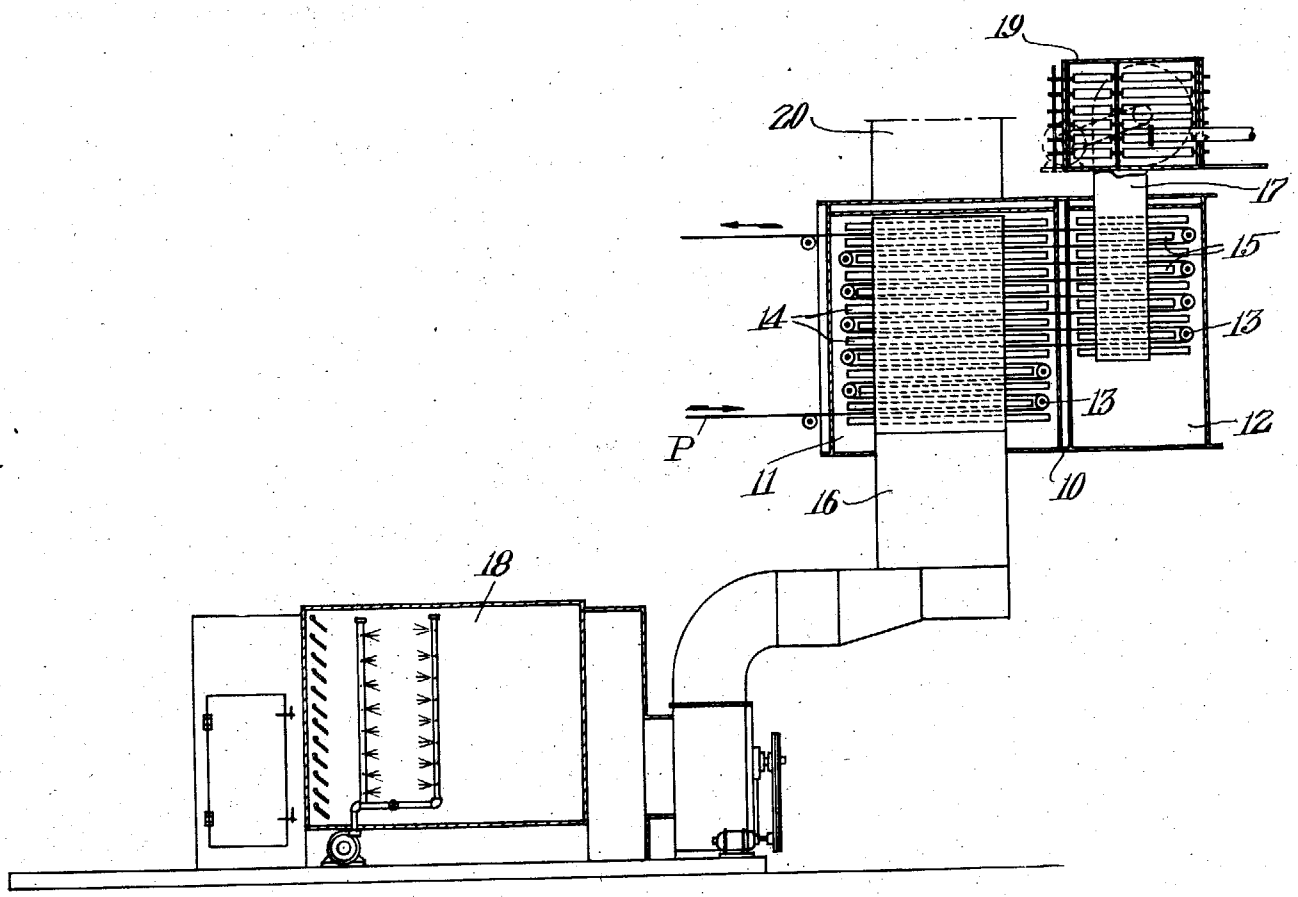
INVENTOR.
Alvin E. Montgomery
BY Kenyon & Kenyon
ATTORNEYS.

Reissued Jan. 23, 1945

Re. 22,593

UNITED STATES PATENT OFFICE 22,593

FINISHING AND CONDITIONING OF PAPER

Alvin E. Montgomery, Elmhurst, Ill., assignor to J. O. Ross Engineering Corporation, New York, N. Y., a corporation of New York Original No. 2,264,542, dated December 2, 1941, Serial No. 210,376, May 27, 1938. Application for reissue January 12, 1943, Serial No. 472,130

12 Claims. (Cl. 92—68)

This invention relates to increasing the moisture content of fibrous water-absorbent material. A specific embodiment of the invention pertains to the finishing and conditioning of paper.

An object of this invention is a method for providing fibrous water-absorbent material with a predetermined moisture content uniformly distributed throughout the material in the shortest possible time.

Paper from a paper-forming machine usually is of insufficient moisture content to render it adaptable for certain uses and its moisture content usually is not uniformly distributed. According to this invention, moisture is added to the paper by impinging it with hot, high humidity air under such condtions as to cause condensation of a deposit of moisture on the surface of the paper. For example, by impinging a sheet of paper with a conditioning air stream of 95° F. temperature and 90% relative humidity, the paper being of approximately 75° F. temperature, a surface deposit is formed on the sheet in the matter of a very few seconds and the temperature of the sheet is brought up very close to the dew point temperature of the air. From then on, moisture can be absorbed into the sheet only by the slow process of approaching equilibrium. The moisture provided by the surface deposit is less than is required to give the sheet the desired moisture content. Therefore, to supply the proper moisture content to the paper, the sheet of paper, after being subjected to the treatment above described, is cooled to approximately its original temperature under conditions as to prevent appreciable evaporation of the deposited moisture and then is again subjected to the above-described treatment with hot humid air. Preferably, the sheet is cooled by impingement with cold air of high humidity, but may be cooled by any other suitable means. The sheet is subjected to repeated cycles of the treatment above described until it reaches the desired moisture content. Each treatment of the cooled paper with the hot humid air is effected in a short period while each cooling operation likewise requires only a short period so that in the matter of a few seconds, the paper is brought to the desired condition of moisture content as only a relatively few passes of the paper through the hot humid air is required to provide it with the desired moisture.

Other objects, novel features and advantages of the invention will become apparent from the following specification and accompanying drawing, wherein the single figure of drawing illustrates schematically one form of apparatus for treating paper according to the invention.

The treating chamber 10 is divided into a cooling compartment 11 and a moistening compartment 12. In each compartment are provided a plurality of rolls 13 so arranged that the paper P passes back and forth in several reaches in the cooling compartment only and then in subsequent reaches passes alternately through the cooling chamber and the moistening compartment and after its last passage through the cooling compartment is discharged from the treating apparatus to a suitable take-up mechanism (not shown).

In the cooling compartment is provided a plurality of ducts 14 which are so arranged that each reach of paper in the cooling compartment lies between two ducts 14. In the moistening compartment 12 is provided a lesser number of ducts 15 so arranged that each reach of paper in the compartment 12 passes between two ducts 15. Both the ducts 14 and 15 are supplied with a large number of relatively small apertures through which air may be discharged into contact with both sides of the paper during each passage through each compartment. A supply duct 16 is provided for delivering cold humid air to the ducts 14 and a supply duct 17 is provided for delivering hot humid air to the ducts 15.

An apparatus 18 of usual construction is provided for supplying cold and preferably moist air of proper temperature to the duct 16 and an apparatus 19 of usual construction is provided for supplying to the duct 17 air having the proper moisture content and of the proper temperature. An exhaust duct 20 is provided for discharging air from both compartments 11 and 12.

The paper to be treated is threaded around the rolls 13 in the two compartments by suitable mechanism (not shown) and is caused to advance at a predetermined rate. Through the duct 16, cold moist air of a predetermined temperature is supplied to the ducts 14 and through the duct 17 heated air of predetermined temperature and moisture content is supplied to the ducts 15. The air thus supplied is caused to impinge on both sides of the paper as it travels through the two compartments.

In normal operation of the apparatus for conditioning paper, paper may be delivered to the apparatus from a paper-making machine (not shown) at approximately the temperature at which it leaves the paper-making machine. The paper is first cooled in the compartment 11 to a predetermined temperature, for example, 75° F. and then is carried into the compartment 12 where it is subjected to air preferably of 95° F. temperature and 90% relative humidity. The paper is then returned to the cooling compartment where its temperature is again reduced and the cycle above described is repeated a predetermined number of times. During its various passes through the moistening compartment, a surface film of moisture is deposited on the paper due to the fact that its temperature is below the dew point temperature of the air supplied to the ducts 15 and the temperature of the sheet is brought up very close to the dew point temperature of the air. After the temperature of the paper has nearly reached the dew point temperature of the air, no further moisture will be deposited except by the slow process of approaching equilibrium. The deposition of the surface film and the elevation of the paper temperature to nearly the dew point temperature of the air takes place in a matter of a few seconds and the paper speed and the length of its path in the compartment 12 is so determined that it remains in the compartment only long enough for such effects to be accomplished. The paper absorbs the deposited moisture and is then returned to the compartment 11 for cooling and appreciable evaporation is prevented by the humid condition of the cooling air. Through successive treatments, the paper absorbs enough increments of moisture to provide it with the desired moisture content in comparatively short time as the alternate passages of the paper through the cooling compartment and moistening compartment require only a few seconds each.

It is of course understood that various modifications may be made in the procedure above described and that other apparatus may be used without in any way departing from the spirit of the invention as defined in the appended claims.

I claim:

1. A process for increasing the moisture content of a continuously moving strip of fibrous water-absorbent material, which comprises passing the strip through a zone and therein directing toward and impinging onto the strip surface a multiplicity of small streams of air, regulating the temperature and relative humidity of the air streams and the introduction temperature of said strip so that the air stream temperature is higher than its dew point temperature and the strip introduction temperature is lower than the dew point temperature of the air streams thereby causing condensation of a film of moisture on the strip in said zone, withdrawing the strip from said zone prior to appreciable absorption of moisture into said strip by approaching equilibrium and cooling said strip to approximately its introduction temperature without appreciable evaporation of moisture therefrom and repeating the treatment until the strip has absorbed the desired content of moisture.

2. The process according to claim 1 in which the cooling is effected by contacting the strip with a current of cold air of relatively high himidity.

3. A process for increasing the moisture content of a continuously moving strip of fibrous water-absorbent material, which comprises passing the strip through a zone and therein directing toward and impinging onto the strip surface a multiplicity of small streams of air of approximately 95° F. and of relative humidity not less than 85%, introducing said strip into said zone at a temperature less than the dew point temperature of said air streams thereby condensing a film of moisture on the strip in said zone, withdrawing the strip from said zone prior to appreciable absorption of moisture into said strip by approaching equilibrium and cooling said strip to approximately its introduction temperature without appreciable evaporation of moisture therefrom and repeating the treatment until the strip has absorbed the desired content of moisture.

4. The process according to claim 3 in which the cooling is effected by contacting the strip with a current of cold air of relatively high humidity.

5. A process for increasing the moisture content of a continuously moving strip of fibrous water-absorbent material of predetermined temperature which comprises impinging the strip in a series of passes with air streams of not less than 85% relative humidity and of higher temperature than the initial temperature of the strip thereby condensing moisture from said air streams on said strip and increasing the moisture content thereof and after each passage cooling the treated strip to a temperature below the dew point temperature of said air streams without appreciable evaporation of moisture from said strip.

6. A process according to claim 5 in which the initial temperature of the strip is approximately 75° F. and the streams of air are of approximately 95° F. temperature and 90% relative humidity.

7. A process for increasing the moisture content of a continuously moving strip of fibrous water-absorbent material of predetermined temperature which comprises impinging the strip in a series of passes with air streams of not less than 85% relative humidity and of higher temperature than the initial temperature of the strip thereby condensing moisture from said air streams on said strip and increasing the moisture content thereof, and after each pass contacting the treated strip with a current of air of lower temperature than the dew point temperature of said first mentioned air streams and of sufficiently high relative humidity to prevent appreciable evaporation of moisture from said strip.

8. A process according to claim 7 in which the initial temperature of the strip is approximately 75° F. and the first mentioned streams of air are of approximately 95° F. temperature and 90% relative humidity.

9. A process for increasing the moisture content of a continuously moving strip of paper which comprises the steps of first cooling the continuously advancing strip of paper to a temperature of approximately 75° F. by means of cold air of high humidity, then contacting the cooled paper strip with an atmosphere of hot air of a temperature of approximately 95° F. and a humidity of approximately 90 per cent, and thereby condense moisture out of said high humidity atmosphere on said cold paper and increase the moisture content thereof.

10. In the process according to claim 9, the additional step of cooling the treated paper to a temperature of approximately 75° F. by means of cool air of sufficiently high humidity to prevent appreciable evaporation of moisture from the paper.

11. A process for increasing the moisture content of a continuously moving strip of freshly made paper which comprises cooling the continuously advancing strip of paper to approximately 75° F., passing the cooled strip through a zone and therein directing toward and impinging onto the cooled paper a multiplicity of small streams of air of approximately 95° F. and of relative humidity not less than 85% thereby condensing a film of moisture on said paper, withdrawing the strip from said zone prior to appreciable absorption of moisture into said strip by approaching equilibrium and cooling the treated paper to approximately 75° F. without appreciable evaporation of moisture therefrom and repeating the treatment until the paper has absorbed the desired content of moisture.

12. The process according to claim 11 in which the initial and final cooling is effected by contacting the paper with a current of cold air of high relative humidity.

ALVIN E. MONTGOMERY.